(12) United States Patent
Aubin-Marchand et al.

(10) Patent No.: US 12,091,110 B2
(45) Date of Patent: Sep. 17, 2024

(54) SUPPORT STRUCTURE FOR CONNECTING AT LEAST ONE SUPPORT WHEEL ASSEMBLY TO A FRAME MEMBER OF A TRACK SYSTEM AND TRACK SYSTEM HAVING THE SAME

(71) Applicant: SOUCY INTERNATIONAL INC., Drummondville (CA)

(72) Inventors: Jeremie Aubin-Marchand, St-Hugues (CA); Yan Roger, Drummondville (CA); Stephane Genois Pelletier, St-Samuel (CA)

(73) Assignee: SOUCY INTERNATIONAL INC., Drummondville (CA)

( * ) Notice: Subject to any disclaimer, the term of this patent is extended or adjusted under 35 U.S.C. 154(b) by 416 days.

(21) Appl. No.: 17/478,299

(22) Filed: Sep. 17, 2021

(65) Prior Publication Data
US 2022/0089232 A1 Mar. 24, 2022

Related U.S. Application Data

(60) Provisional application No. 63/080,139, filed on Sep. 18, 2020.

(51) Int. Cl.
*B62D 55/15* (2006.01)
*B62D 55/108* (2006.01)

(52) U.S. Cl.
CPC ......... *B62D 55/15* (2013.01); *B62D 55/1086* (2013.01)

(58) Field of Classification Search
CPC .... B62D 55/15; B62D 55/14; B62D 55/1086; B62D 55/104
See application file for complete search history.

(56) References Cited

U.S. PATENT DOCUMENTS

| | | |
|---|---|---|
| 1,506,431 A | 8/1924 | Adolphe |
| 3,695,737 A | 10/1972 | Alexander et al. |
| 3,913,987 A | 10/1975 | Baldwin et al. |
| 3,974,891 A | 8/1976 | Persson |
| 3,985,402 A | 10/1976 | Reinsma |
| 4,166,511 A | 9/1979 | Stedman |
| 4,519,654 A | 5/1985 | Satzler et al. |
| 4,647,116 A | 3/1987 | Trask |
| 4,681,177 A | 7/1987 | Zborowski |

(Continued)

FOREIGN PATENT DOCUMENTS

WO 2021108928 A1 6/2021

*Primary Examiner* — Jason R Bellinger
(74) *Attorney, Agent, or Firm* — BCF LLP

(57) ABSTRACT

A support structure having at least one connecting member, a shaft, at least one axle transversally connected to the shaft and at least one resilient member for connecting the at least one support wheel assembly to a frame of a track system is disclosed. The at least one resilient body defines an aperture, in which one of first and second portions of the shaft is received, and has an inner portion that is fixedly connected to the one of first and second portions and an outer portion that is fixedly connected to the at least one connecting member. Upon resilient deformation of the at least one resilient member, the shaft is rotatable, and the at least one axle is pivotable, about the longitudinal axis. The at least one resilient body biases the shaft toward an initial position upon rotation thereof. A track system having the support structure is also disclosed.

11 Claims, 9 Drawing Sheets

(56) References Cited

U.S. PATENT DOCUMENTS

| | | |
|---|---|---|
| 5,785,395 A | 7/1998 | Crabb |
| 5,899,542 A | 5/1999 | Lykken et al. |
| 5,899,543 A | 5/1999 | Lykken et al. |
| 6,712,549 B2 | 3/2004 | Roth |
| 6,739,679 B2 | 5/2004 | Ueno et al. |
| 6,951,260 B1 | 10/2005 | Isley |
| 7,726,749 B2 | 6/2010 | Rosenboom |
| 8,147,007 B2 | 4/2012 | Rainer |
| 9,440,692 B2 | 9/2016 | Vik et al. |
| 9,452,796 B2 | 9/2016 | Franck et al. |
| 9,457,854 B2 | 10/2016 | Van Mill et al. |
| 9,505,454 B1 | 11/2016 | Kautsch |
| 10,112,663 B1 | 10/2018 | Kautsch |
| 10,137,949 B2 | 11/2018 | Kahlig |
| 10,266,215 B2 | 4/2019 | Jean et al. |
| 10,308,296 B2 | 6/2019 | Piens et al. |
| 11,794,828 B2 * | 10/2023 | Aubin-Marchand .. B62D 55/32 |
| 2012/0242142 A1 | 9/2012 | Kautsch et al. |
| 2016/0194038 A1 | 7/2016 | Jean |
| 2017/0274946 A1 | 9/2017 | Vik et al. |
| 2018/0022407 A1 | 1/2018 | Lussier et al. |
| 2024/0025496 A1 * | 1/2024 | Aubin-Marchand .. B62D 55/15 |

* cited by examiner

SUPPORT STRUCTURE FOR CONNECTING AT LEAST ONE SUPPORT WHEEL ASSEMBLY TO A FRAME MEMBER OF A TRACK SYSTEM AND TRACK SYSTEM HAVING THE SAME

CROSS-REFERENCE TO RELATED APPLICATION

The present application claims priority to United States Provisional Patent Application Ser. No. 63/080,139, filed Sep. 18, 2020, entitled "*Support Structure For Connecting At Least One Support Wheel Assembly To A Frame Member Of A Track System And Track System Having The Same*", which is incorporated by reference herein in its entirety.

TECHNICAL FIELD

The present technology generally relates to support structures for track systems and track systems for vehicles.

BACKGROUND

Certain vehicles, such as, for example, agricultural vehicles (e.g., harvesters, combines, tractors, etc.), construction vehicles (e.g., trucks, front-end loaders, etc.) and recreational vehicles (e.g., all-terrain vehicles, utility-terrain vehicles, side-by-side vehicles, etc.) are used on ground surfaces that are soft, slippery and/or uneven (e.g., soil, mud, sand, ice, snow, etc.).

Conventionally, such vehicles have had large wheels with tires on them to move the vehicle along the ground surface. Under certain conditions, such tires may have poor traction on some kinds of ground surfaces and, as these vehicles are generally heavy, the tires may compact the ground surface in an undesirable way owing to the weight of the vehicle. For example, when the vehicle is an agricultural vehicle, the tires may compact the soil in such a way as to undesirably inhibit the growth of crops. When the vehicle is a recreational vehicle, the tires may lack traction on certain terrain and in certain conditions.

In order to reduce the aforementioned drawbacks, to increase traction and to distribute the weight of the vehicle over a larger area on the ground surface, track systems were developed to be used in place of at least some of the wheels and tires on the vehicles. For example, under certain conditions, track systems enable agricultural vehicles to be used in wet field conditions as opposed to its wheeled counterpart. In other conditions, track systems enable recreational vehicles to be used in low traction terrains such as snowy roads.

Conventional track systems do, however, present some inconveniences.

When conventional track systems travel over laterally uneven surfaces, wheels can come into contact with drive lugs, which can result in premature wear of the drive lugs of the track, and/or sometimes result in detracking of the track system. Travelling over laterally uneven surface with conventional track systems can also lead to uneven load distribution across the track, which can result in premature wear of the track of the track system.

Therefore, there is desire for a track system that could mitigate the above-mentioned issues.

SUMMARY

It is therefore an object of the present technology to ameliorate the situation with respect to at least one of the inconveniences present in the prior art.

It is also an object of the present technology to provide an improved track system and support wheel assemblies at least in some instances as compared with some of the prior art.

The present technology relates to a support structure for a track system. The support structure has an axle, and a support wheel assembly connected to the axle. The axle is pivotable, thereby allowing the support wheel assembly to pivot. As such, the support structure can better conform to ground irregularities, which reduces wear and improves load distribution on an endless track of the track system.

In the context of the following description, "outwardly" or "outward" means away from a longitudinal center plane of the track system, and "inwardly" or "inward" means toward the longitudinal center plane. In addition, in the context of the following description, "longitudinally" means in a direction parallel to the longitudinal center plane of the track system in a plane parallel to flat level ground, "laterally" means in a direction perpendicular to the longitudinal center plane in a plane parallel to flat level ground, and "generally vertically" means in a direction contained in the longitudinal center plane along a height direction of the track system generally perpendicular to flat level ground. Note that in the Figures, a "+" symbol is used to indicate an axis of rotation. In the context of the present technology, the term "axis" may be used to indicate an axis of rotation. Also, the terms "pivot assembly" and "wheel assemblies" include all the necessary structure (bearing structures, pins, axles and other components) to permit a structure/wheel to pivot/rotate about an axis, as the case may be. Moreover, the direction of forward travel of the track system is indicated by an arrow in FIG. 1. In the present description, the "leading" components are components located towards the front of the vehicle defined consistently with the vehicle's forward direction of travel, and the "trailing" components are components located towards the rear of the vehicle defined consistently with the vehicle's forward direction of travel. In the following description and accompanying Figures, the track system is configured to be attached to a right side of the chassis of the vehicle.

According to an aspect of the present technology, there is provided a support structure for connecting at least one support wheel assembly to a frame of a track system having a longitudinal center plane. The support structure has at least one connecting member, a shaft, at least one axle and at least one resilient member. The at least one connecting member is adapted to connect the support structure to the frame. The shaft has a first portion and a second portion, and is received in the at least one connecting member. The shaft has a longitudinal axis that extends parallel to the longitudinal center plane. The at least one axle is adapted for supporting the at least one support wheel assembly. The at least one axle is transversally connected to the shaft. The at least one axle extends outwardly from the at least one connecting member. The at least one resilient member is at least partially received in the at least one connecting member. The at least one resilient member defines an aperture. One of the first and second portions of the shaft is received in the aperture. The at least one resilient member has an inner portion and an outer portion. The inner portion of the at least one resilient member is fixedly connected to the one of the first and second portions of the shaft, and the outer portion of the at least one resilient member is fixedly connected to the at least one connecting member. The shaft is rotatable about the longitudinal axis upon resilient deformation of the at least one resilient member, and the at least one axle is pivotable about the longitudinal axis together with the shaft. The shaft has an initial position, and the at least one resilient member biases the shaft toward the initial position upon rotation of the shaft.

In some embodiments, the shaft is rotatable about the longitudinal axis within a range of motion ranging between about −15 and about +15 degrees relative to the initial position.

In some embodiments, the shaft is rotatable about the longitudinal axis within a range of motion ranging between about −10 and about +10 degrees relative to the initial position.

In some embodiments, the at least one resilient member includes first and second resilient members. The one of the first and second portions of the shaft is fixedly connected to the inner portion of the first resilient member. The at least one connecting member includes first and second connecting members, the first connecting member at least partially receives the first resilient member, and is fixedly connected thereto. The other one of the first and second portions of the shaft is received in the aperture of the second resilient member. The inner portion of the second resilient member is fixedly connected to the other one of the first and second portions of the shaft, and the outer portion of the second resilient member is fixedly connected to the second connecting member.

In some embodiments, the frame defines a first recess on a first side of the longitudinal center plane and a second recess on a second side of the longitudinal center plane. The first recess is sized and dimensioned for stopping pivotal movement of the at least one axle at about 15 degrees in a first direction relative to the initial position, and the second recess is sized and dimensioned for stopping pivotal movement of the at least one axle at about 15 degrees in a second direction relative to the initial position.

In some implementations of these embodiments, the first recess is sized and dimensioned for stopping pivotal movement of the at least one axle at about 16 degrees, or about 15 degrees, or about 14 degrees, or about 13 degrees, or about 12 degrees, or about 11 degrees, or about 10 degrees in a first direction relative to the initial position, and the second recess is sized and dimensioned for stopping pivotal movement of the at least one axle at about 16 degrees, or about 15 degrees, or about 14 degrees, or about 13 degrees, or about 12 degrees, or about 11 degrees, or about 10 degrees in a second direction relative to the initial position.

In some embodiments, the at least one resilient member has a hollow cylindrical shape.

In some embodiments, the at least one axle is connected offset from the center of the shaft.

In some embodiments, the at least one axle is extending outwardly from the shaft in only one direction.

In some embodiments, the at least one axle includes a first axle and a second axle longitudinally spaced from each other along the shaft.

In some embodiments, the at least one resilient member is made of rubber-based material.

In some embodiments, the aperture of the at least one resilient member and a portion of the shaft define at least one of grooves, knurls, and projecting members to enhance the fixed connection therebetween.

In another aspect of the present technology, there is provided a track system having the support structure according to the above aspect or according to the above aspect and one or more of the above embodiments.

In some embodiments, the frame has an opening at a bottom side adapted to receive at least a portion of the support structure.

In accordance with another aspect of the technology, there is provided a vehicle including the track system described above.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Introduction

Before continuing to describe the present disclosure in further detail, it is to be understood that this disclosure is not limited to specific devices, systems, methods, or uses or process steps, and as such they may vary. It must be noted that, as used in this specification and the appended claims, the singular form "a", "an" and "the" include plural referents unless the context clearly dictates otherwise.

As used herein, the term "about" in the context of a given value or range refers to a value or range that is within 20%, preferably within 10%, and more preferably within 5% of the given value or range.

It is convenient to point out here that "and/or" where used herein is to be taken as specific disclosure of each of the two specified features or components with or without the other. For example, "A and/or B" is to be taken as specific disclosure of each of (i) A, (ii) B and (iii) A and B, just as if each is set out individually herein.

Figure 1:
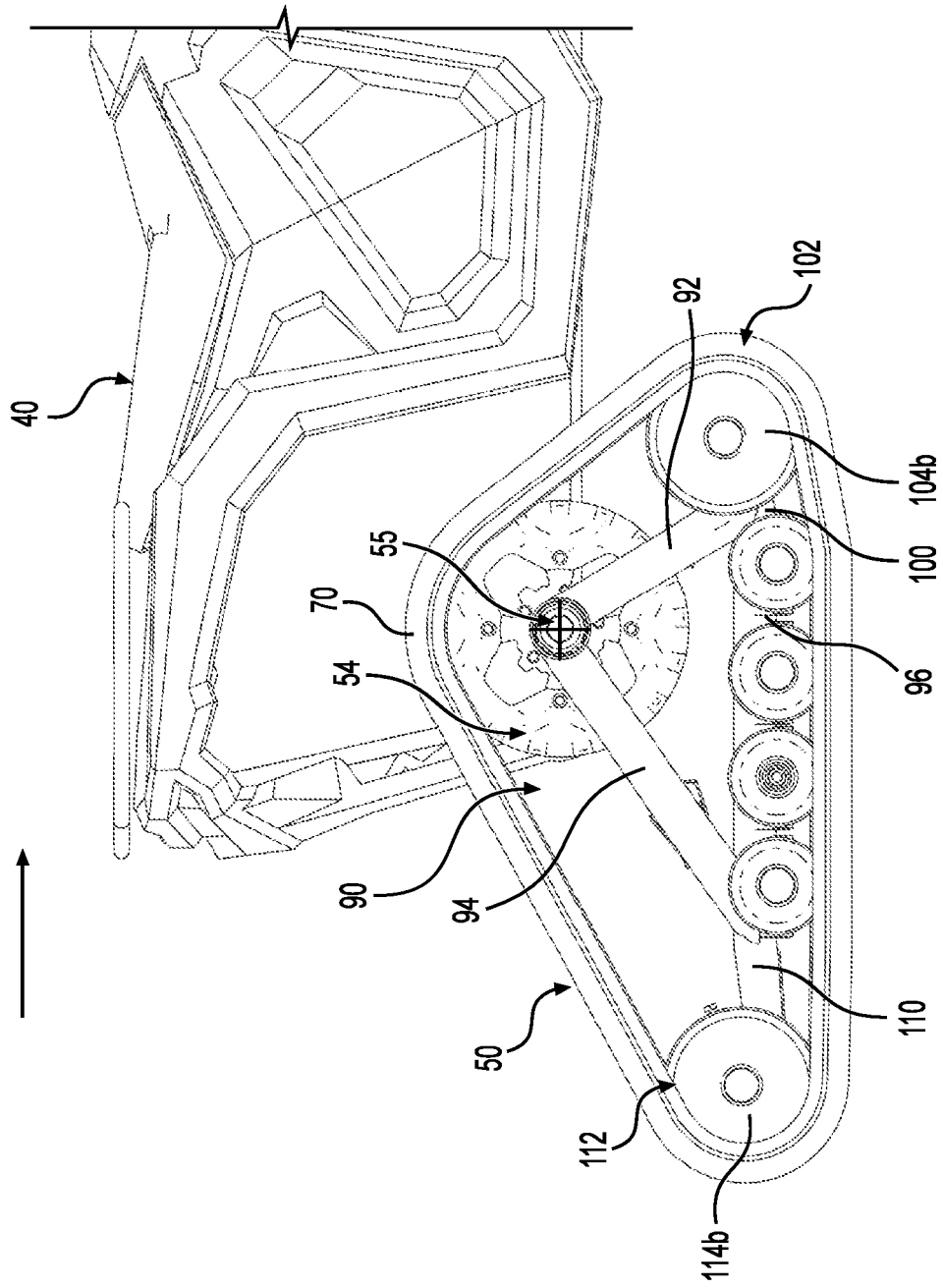
FIG. 1 is a close-up, right side elevation view of an all-terrain vehicle equipped with a rear, right track system having a support structure in accordance with an embodiment of the present technology.
Figure 2:
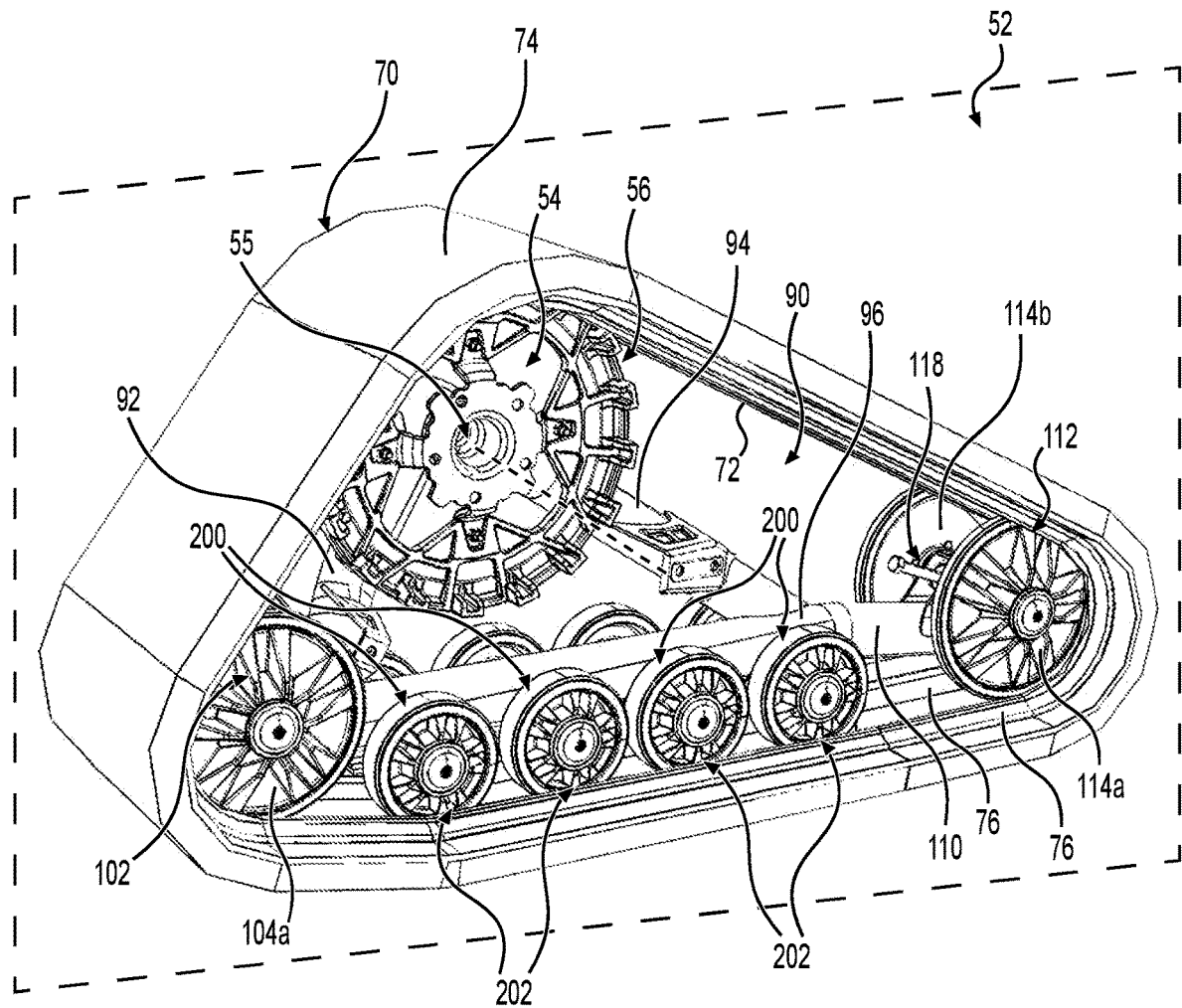
FIG. 2 is a perspective view taken from a top, front, left side of the track system of FIG. 1.

With reference to FIGS. 1 and 2, a track system 50, which has a support structure 200, is illustrated. It is to be expressly understood that the track system 50 and the support structure 200 are merely embodiments of the present technology. Thus, the description thereof that follows is intended to be only a description of illustrative examples of the present technology. This description is not intended to define the scope or set forth the bounds of the present technology. In some cases, what are believed to be helpful examples of modifications or alternatives to the track system 50 and the support structure 200 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing or embodying that element of the present technology. As a person skilled in the art would understand, this is likely not the case.

In addition, it is to be understood that the track system 50 and the support structure 200 may provide in certain aspects simple embodiments of the present technology, and that where such is the case it has been presented in this manner as an aid to understanding. As persons skilled in the art would understand, various embodiments of the present technology may be of a greater complexity than what is described herein.

Figure 4:
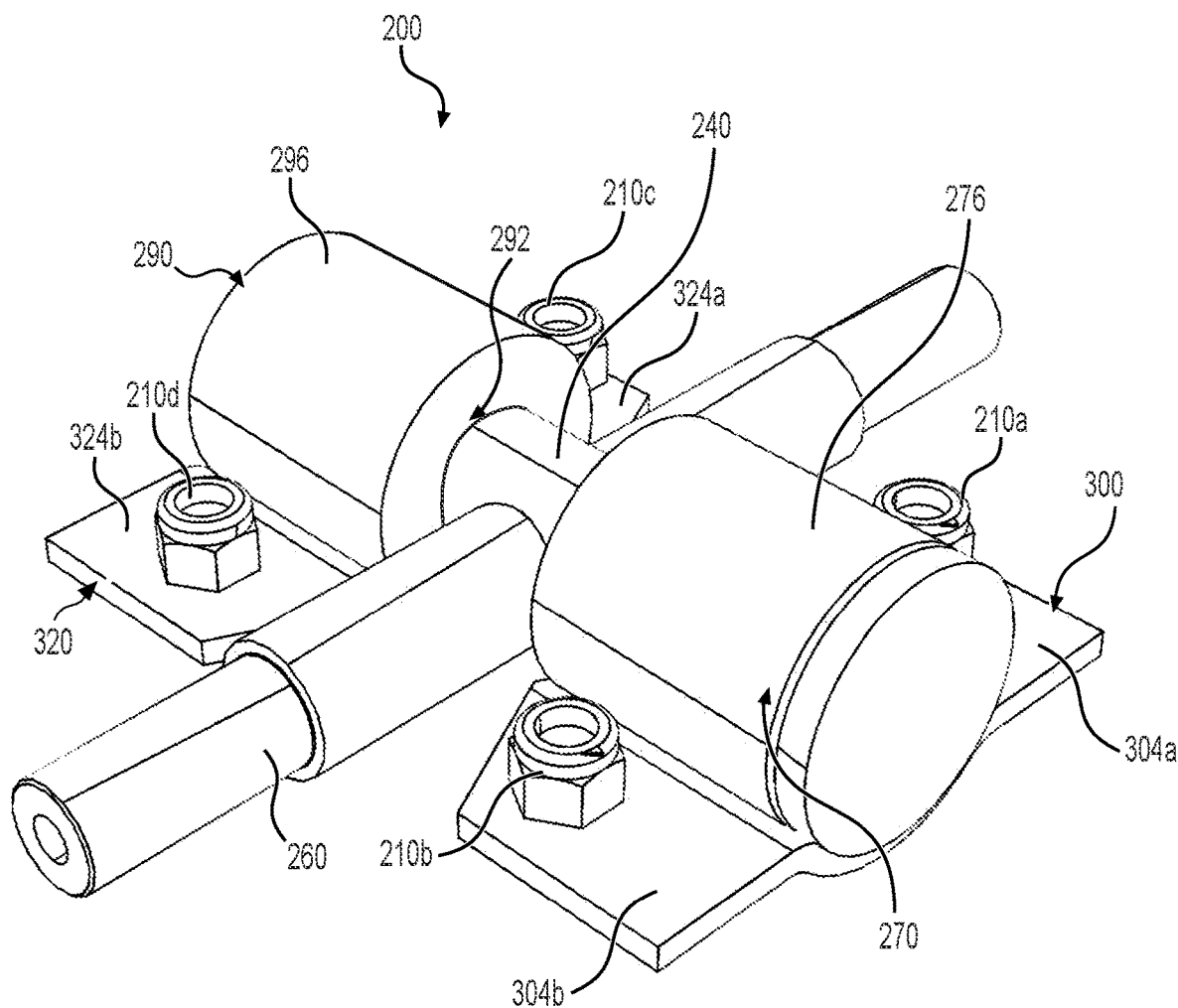
FIG. 4 is a perspective view taken from a top, front, right side of the support structure of FIG. 1, with the wheels of the support wheel assembly being omitted.

Generally described, the present technology relates to the support structure 200 connected to the track system 50, and to track systems 50 including the support structure 200. As will be better understood from the accompanying Figures, the support structure 200 has a pivotable axle 260 (FIG. 4) connected to leading and trailing resilient members 270, 290 by a shaft 240. When resiliently deformed in a circumferential direction 250 (shown as double arrow in FIGS. 5 and 6) about a longitudinal axis 246 (FIGS. 5 and 6), the leading and trailing resilient members 270, 290 bias the shaft 240, and thus the axle 260, toward an initial position. The support structure 200 will be presented herein with reference to an all-terrain vehicle 40 shown partially in FIG. 1. As will become apparent from the description below, the support structure 200 may assist the track system 50 to improve load distribution of the track system 50.

All-Terrain-Vehicle

Referring to FIG. 1, the track system 50 is operatively connected to the vehicle 40. The vehicle 40 is an all-terrain vehicle (ATV). It is contemplated that in alternate embodiments, the vehicle 40 could be a snowmobile, a side-by-side vehicle, a utility-terrain vehicle or another recreational vehicle. It is also contemplated that the vehicle 40 could be a harvester, a tractor, or another agricultural vehicle. Other vehicles are contemplated, and the track system 50 including the present technology is structured and configured to be used on such vehicles. Though only the rear, right track system 50 is shown and described herein, the vehicle 40 includes front right, front left and rear left track systems configured to be operatively connected to their respective corners of the vehicle 40. It is contemplated that in some embodiments, the vehicle 40 could be adapted to receive more or less than four track systems 50.

Track System

Referring to FIGS. 1 and 2, the track system 50 has a longitudinal center plane 52 that passes through a lateral center of the track system 50, and splits the track system 50 into a left longitudinal side and a right longitudinal side. For the purpose of the following description, components that are qualified as "left" or "right" are positioned on the corresponding left longitudinal side and right longitudinal side of the track system 50, unless mentioned otherwise.

The track system 50 has a sprocket wheel assembly 54 which can be operatively connected to a driving axle (not shown) of the vehicle 40. It is contemplated that in some embodiments, the sprocket wheel assembly 54 could be connected to a non-driving axle. The driving axle drives the sprocket wheel assembly 54 such that the sprocket wheel assembly 54 can rotate about a sprocket axis 55. The sprocket axis 55 is perpendicular to the longitudinal center plane 52. The sprocket wheel assembly 54 defines two sets of laterally spaced recesses 56 that are spaced on the circumference of the sprocket wheel assembly 54. The two sets of laterally spaced recesses 56 are adapted, as will be described in greater detail below, to receive left and right sets of laterally spaced lugs 76 provided on an inner surface 72 of the endless track 70. It is contemplated that in some embodiments, there could be only one set of recesses 56.

The track system 50 has a frame 90. The frame 90 includes a leading frame arm 92, a trailing frame arm 94 and a frame member 96. The leading and trailing frame arms 92, 94 are jointly connected around the driving axle of the vehicle 40, the joint connection being positioned laterally outwardly from the sprocket wheel assembly 54. The leading frame arm 92 extends from the driving axle, in the forward and downward directions, and connects to a forward portion of the frame member 96. The trailing frame arm 94 extends from the driving axle, in the rearward and downward directions, and connects to a rearward portion of the frame member 96. The frame member 96 is positioned below the leading and trailing frame arms 92, 94, and extends parallel to the longitudinal center plane 52.

Still referring to FIG. 2, the track system 50 has a leading idler linkage 100 connected to the forward portion of the frame member 96. It is contemplated that in some embodiments, the leading idler linkage 100 could be integrated to the frame member 96. It is also contemplated that in some embodiments, the leading idler linkage 100 could be omitted. The leading idler linkage 100 has a leading idler wheel assembly 102 rotatably connected thereto. The leading idler wheel assembly 102 includes left and right idler wheels 104a, 104b.

The track system 50 also has a trailing idler linkage 110 connected to the rearward portion of the frame member 96. It is contemplated that in some embodiments, the trailing idler linkage 110 could be integrated to the frame member 96. It is also contemplated that in some embodiments, the trailing idler linkage 110 could be omitted. The trailing idler linkage 110 has a trailing idler wheel assembly 112 rotatably connected thereto. The trailing idler wheel assembly 112 includes left and right idler wheels 114a, 114b.

Referring to FIG. 2, the track system 50 further has a tensioner assembly 118 connected to trailing idler wheel assembly 112 and that is operable to adjust the tension in the endless track 70 by selectively moving the trailing idler wheel assembly 112 forward or backward. The tensioner assembly 118 could be connected to the leading idler wheel assembly 102 in another embodiment.

The track system 50 has four support structures 200 connected to the frame member 96. The support structures 200 are disposed longitudinally between the leading and trailing idler wheel assemblies 102, 112. The track system 50 has four support wheel assemblies 202. Each one of the four support wheel assemblies 202 is rotatably connected to one of the support structures 200. The support wheel assemblies 202 each include left and right support wheels 204a, 204b. The support structures 200 will be described in greater detail below.

In this embodiment, track system 50 also has the endless track 70 that extends around components of the track system 50, including the frame 90, the support structures 200, the leading and trailing idler wheel assemblies 102, 112, the support wheel assemblies 202. The endless track 70 has the inner surface 72 and an outer surface 74. The inner surface 72 of endless track 70 has the left and right sets of lugs 76. The left and right set of lugs 76 are adapted to be received within the recesses 56 of the sprocket wheel assembly 54. It is contemplated that in some embodiments, there could be only one set of lugs 76. The outer surface 74 of the endless track 70 has a tread defined thereon. It is contemplated that the tread could vary from one embodiment to another. In some embodiments, the tread could depend on the type of vehicle 40 on which the track system 50 is to be used and/or the type of ground surface on which the vehicle 40 is destined to travel. In the present embodiment, the endless track 70 is an endless polymeric track. It is contemplated that in some embodiments, the endless track 70 could be constructed of a wide variety of materials and structures including metallic components known in track systems 50.

Support Structure

Referring now to FIGS. 3 to 6, the support structure 200 will be described in greater detail. As mentioned above, in the present embodiment of the track system 50, there are four support structures 200. It is contemplated that in some embodiments, there could be more or less than four support structures 200 and corresponding number of support wheel assemblies 202. As the four support structures 200 are similar, only one of the support structures 200 will be described in detail herein.

Referring to FIGS. 3 to 6, the support structure 200 is connected to the frame member 96. It is also to be understood that the support structure 200 can be provided as a standalone assembly that is connectable to the frame member 96 of the track system 50. The support structure 200 includes a shaft 240 received in the frame member 96 and extending in the same direction as the frame member 96. The support structure 200 further has an axle 260 transversally connected to the shaft 240 and extending outwardly from the frame member 96. It is contemplated that in some embodiments, the support structure 200 could be connected to the frame member 96 differently. For instance, the shaft 240 could be connected to the frame member 96 without being received therein. The support structure 200 further has a leading resilient member 270 connected to the shaft 240, a trailing resilient member 290 also connected to the shaft 240, a leading connecting member 300 connected to the frame member 96, and a trailing connecting member 320 also connected to the frame member 96. The axle 260 also extends outwardly from the leading and trailing connecting members 300, 320. The support wheel assembly 202 is rotatably connected to the axle 260. As mentioned above, the support wheel assembly 202 includes the left and right support wheels 204a, 204b, and the support wheels 204a, 204b are connectable to the corresponding left and right end portions of the axle 260.

Figure 3:
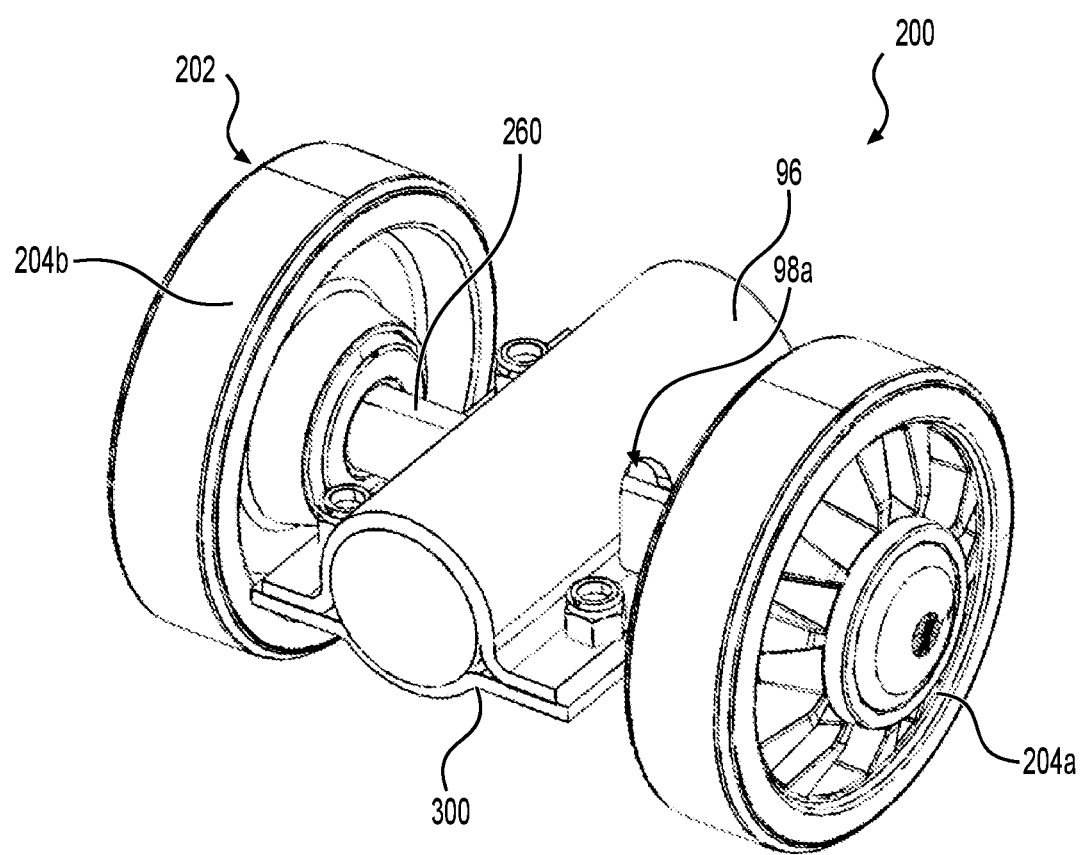
FIG. 3 is a perspective view taken from a top, front, left side of the support structure of FIG. 1 with a portion of a frame member and a support wheel assembly connected thereto.

As previously mentioned, the support structure 200 is connected to the frame member 96. In the present embodiment, the frame member 96 has a semi-tubular shape, with an opening at a bottom side thereof (best seen in FIG. 3), and extends parallel to the longitudinal center plane 52. The opening is adapted to receive components of the support structure 200 from below, as will be described below. It is contemplated that in some embodiments, the opening could be omitted such that the components of the support structure 200 would connect directly onto the frame member 96. Referring to FIG. 3, a portion of the frame member 96 is described. The portion of the frame member 96 connected to the support structure 200 currently being described defines four apertures (not seen), each of the apertures being adapted for receiving a fastener therein. The portion of the frame member 96 also defines left and right recesses 98a, 98b, from which the axle 260 extends laterally. It is contemplated that in some embodiments, there could be more than one frame member 96 connected to one another.

Figure 5:
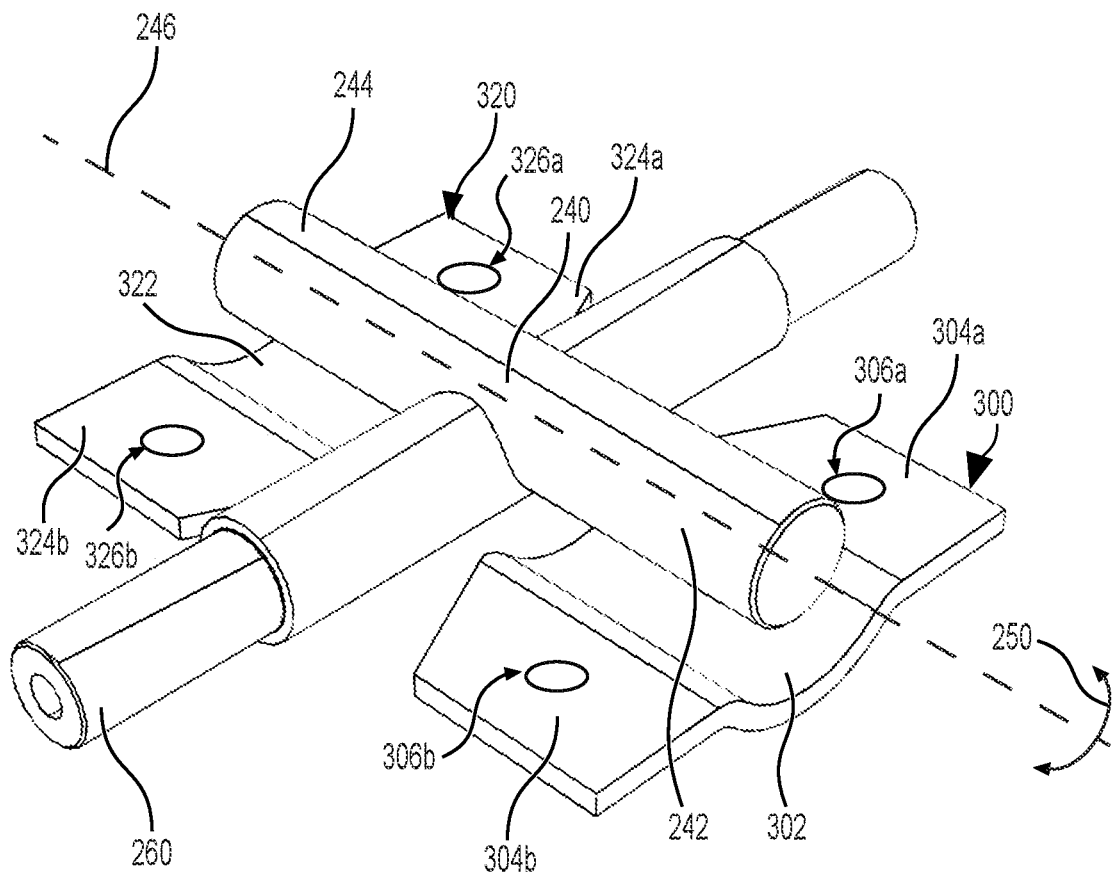
FIG. 5 is a perspective view taken from a top, front, right side of the support structure of FIG. 1, with leading and trailing resilient members being omitted.

Referring to FIG. 5, the shaft 240 has a leading portion 242 and a trailing portion 244. The shaft 240 has a longitudinal axis 246 (shown in FIG. 5) that extends parallel to the longitudinal center plane 52. The shaft 240 is received in the opening of the frame member 96. As will be described in greater detail below, the shaft 240 is rotatable about the longitudinal axis 246 within a predetermined range of motion.

The axle 260, which is adapted for supporting the support wheel assembly 202, is fixedly and transversally connected to the center of the shaft 240. The axle 260 extends laterally outwardly from the shaft 240. It is contemplated that in some embodiments, the axle 260 could be connected to the shaft 240 offset from the center of the shaft 240. It is also contemplated that in some embodiments, the axle 260 could extend laterally outwardly from the shaft 240 in only one direction. It is also contemplated that in some embodiments, there could be more than one axle 260 connected to the shaft 240. For example, left and right axles could be respectively connected to the left and right sides of the shaft 240, or there could be two longitudinally spaced axles extending laterally from the shaft 240. As will be described in greater detail below, the axle 260 is pivotable about the longitudinal axis 246 together with the shaft 240.

The support structure 200 has the leading resilient member 270 and the trailing resilient member 290. It is contemplated that in some embodiments, the support structure 200 could have more or less than two resilient members 270, 290. The leading and trailing resilient members 270, 290 are made of suitable resilient material, such a rubber-based material, and are resiliently deformable.

In the present embodiment, the leading resilient member 270 has a hollow, cylindrical shape, and extends parallel to the longitudinal center plane 52. The leading resilient member 270 defines an aperture 272 in the longitudinal direction, passing through the center thereof. As such, the leading resilient member 270 has an inner portion 274 and an outer portion 276. It is contemplated that in some embodiments, the leading resilient members 270 could have a prismatic shape, or any other suitable shape. In such embodiments, it is contemplated that the frame member 96 could be complimentarily shaped, so that the leading resilient members 270 could be received therein.

The aperture 272 is adapted for receiving the leading portion 242 of the shaft 240. More precisely, in the present embodiment, the aperture 272 is sized such that there is a press-fit connection between the leading resilient member 270 and the shaft 240. The connection results in the leading portion 242 being fixedly connected to the inner portion 274. Thus, in the present embodiment, the leading portion 242 is rotatably and longitudinally fixed to the inner portion 274. It is contemplated that in some embodiments, the leading portion 242 and/or the inner portion 274 could define grooves, knurls and/or have projecting members that further enhance the fixed connection therebetween. It is also contemplated that in other embodiments, the shaft 240 and the leading resilient member 270 could be connected by fasteners, by an adhesive or by another connector. In yet other embodiments, the shaft 240 could be connected to the leading resilient member 270 by vulcanization.

Similarly, the trailing resilient member 290 has a hollow cylindrical shape that extends parallel to the longitudinal center plane 52. The trailing resilient member 290 defines an aperture 292 in the longitudinal direction, passing through the center thereof. As such, the trailing resilient member 290 has an inner portion 294 and an outer portion 296. It is contemplated that in some embodiments, the trailing resilient member 290 could have a prismatic shape, or any other suitable shape. In such embodiments, it is contemplated that the frame member 96 could be shaped complementarily, so that the trailing resilient member 290 could be received therein.

The aperture 292 is adapted for receiving the trailing portion 244 of the shaft 240. More precisely, in the present embodiment, the aperture 292 is sized such that there is a press-fit connection between the trailing resilient member 290 and the shaft 240. The connection results in the trailing portion 244 being fixedly connected to the inner portion 294. Thus, in the present embodiment, the trailing portion 244 is rotatably and longitudinally fixed to the inner portion 294. It is contemplated that in some embodiments, the trailing portion 244 and/or the inner portion 294 could define grooves, knurls and/or have projecting members. The grooves, knurls and/or projecting members could enhance the fixed connection between the trailing portion 244 and the inner portion 294. It is also contemplated that in other embodiments, the shaft 240 and the trailing resilient member 290 could be connected by fasteners, by an adhesive or by another connector. In yet other embodiments, the shaft 240 could be connected to the trailing resilient member 290 by vulcanization.

Figure 6:
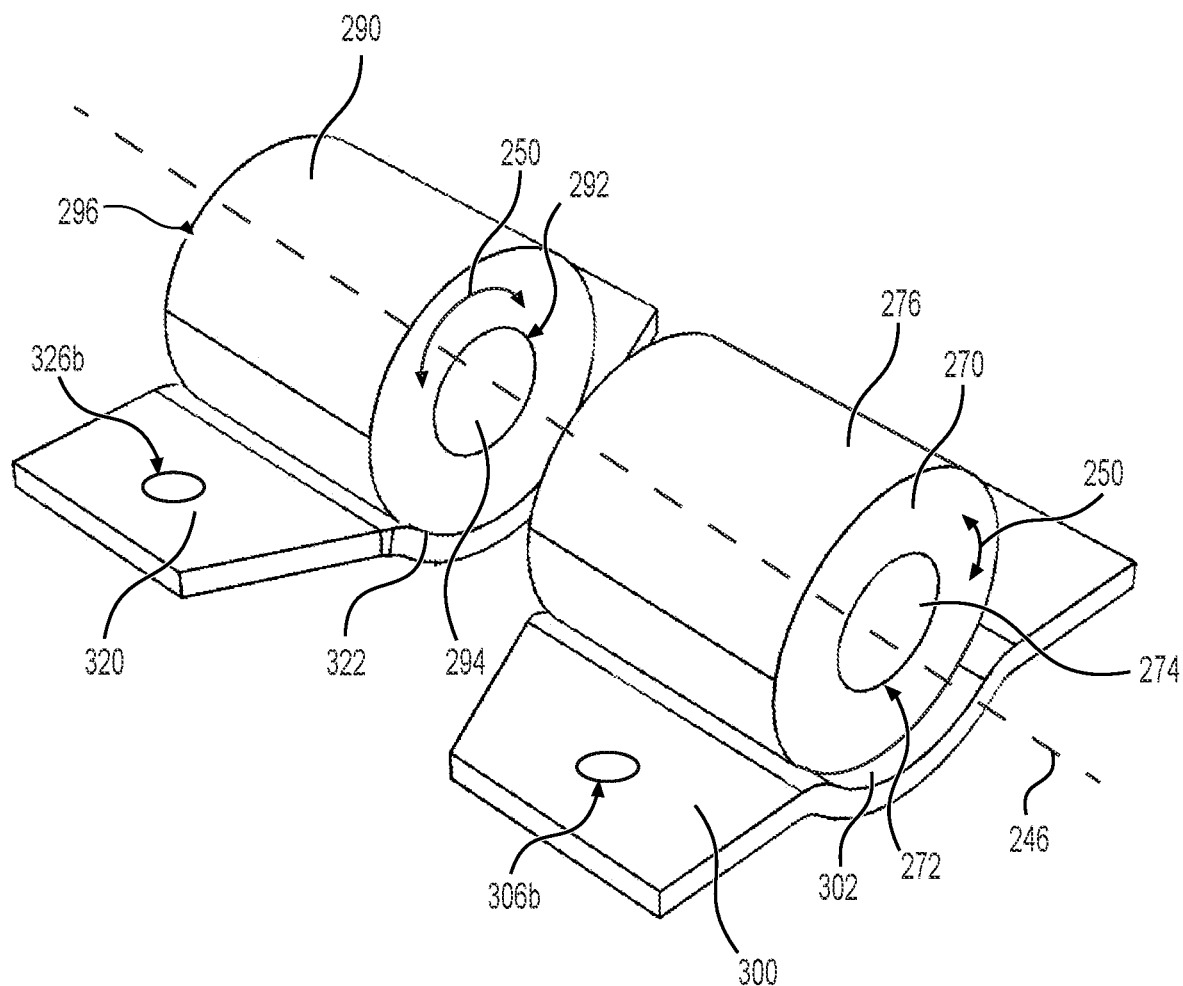
FIG. 6 is a perspective view taken from a top, front, right side of the support structure of FIG. 1, with an axle and a shaft being omitted.

Still referring to FIGS. 5 and 6, the support structure 200 has the leading connecting member 300, and the trailing connecting member 320. It is contemplated that in some embodiments, there could be more or less than two connecting members 300, 320. The leading and trailing connecting members 300, 320 are adapted to be connected to the frame member 96, and to not interfere with the pivotal movement of the axle 260.

The leading connecting member 300 has a curved middle portion 302 that is adapted to receive the outer portion 276 of leading resilient member 270. The leading connecting member 300 also has left and right flat portions 304a, 304b that extend horizontally and laterally outwardly from the curved middle portion 302. The left flat portion 304a defines an aperture 306a adapted for receiving a fastener therein, and the right flat portion 304b defines an aperture 306b adapted for receiving a fastener therein.

The trailing connecting member 320 has a curved middle portion 322 that is adapted to receive the outer portion 296 of the trailing resilient member 290. The trailing connecting member 320 also has left and right flat portions 324a, 324b that extend horizontally and laterally outwardly from the curved middle portion 322. The left flat portion 324a defines an aperture 326a adapted for receiving a fastener therein, and the right flat portion 324b defines an aperture 326b adapted for receiving a fastener therein.

The support structure 200 also includes fasteners (not shown) and nuts 210a, 210b, 210c, 210d, which fasten the leading and trailing connecting members 300, 320 to the frame member 96. It is contemplated that in other embodiments, the leading and trailing connecting members 300, 320 could be connected by welding, riveting or by another suitable connector.

Figure 7:
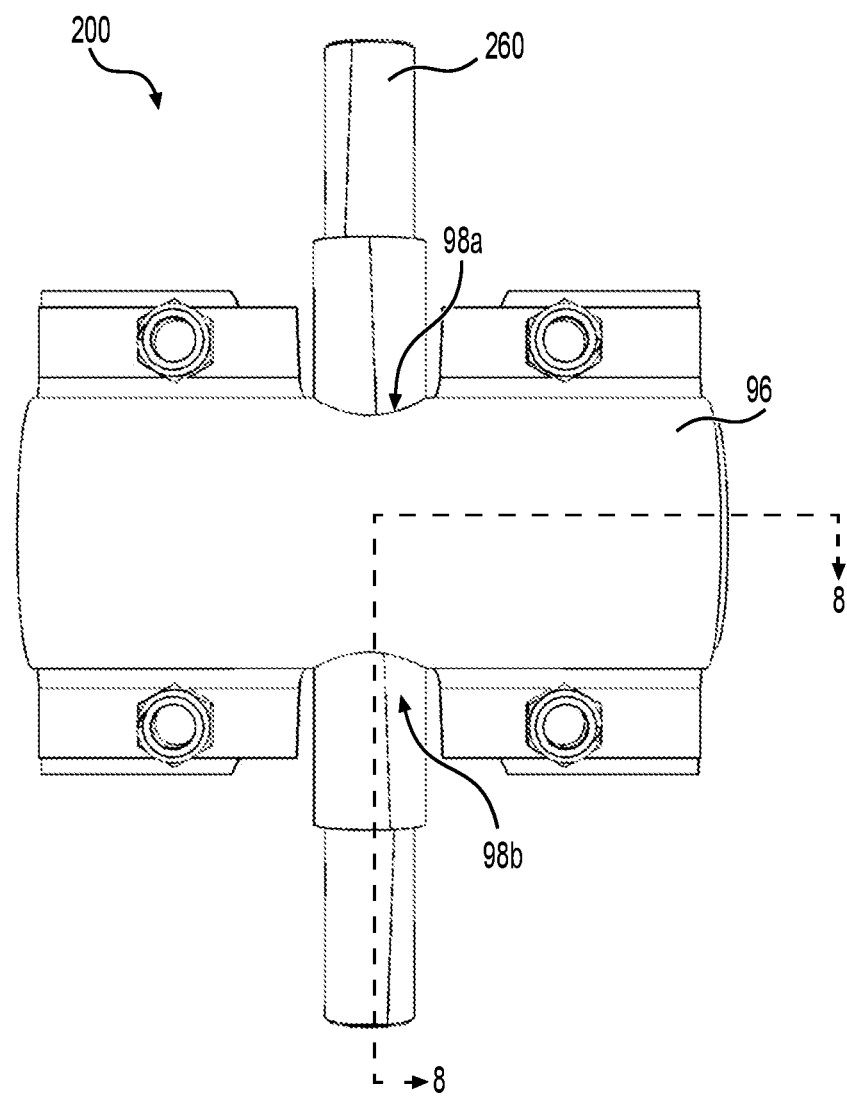
FIG. 7 is a top plan view of the support structure of FIG. 1, with the support structure being connected to the portion of the frame member, and with a leading connecting member being omitted.
Figure 8:
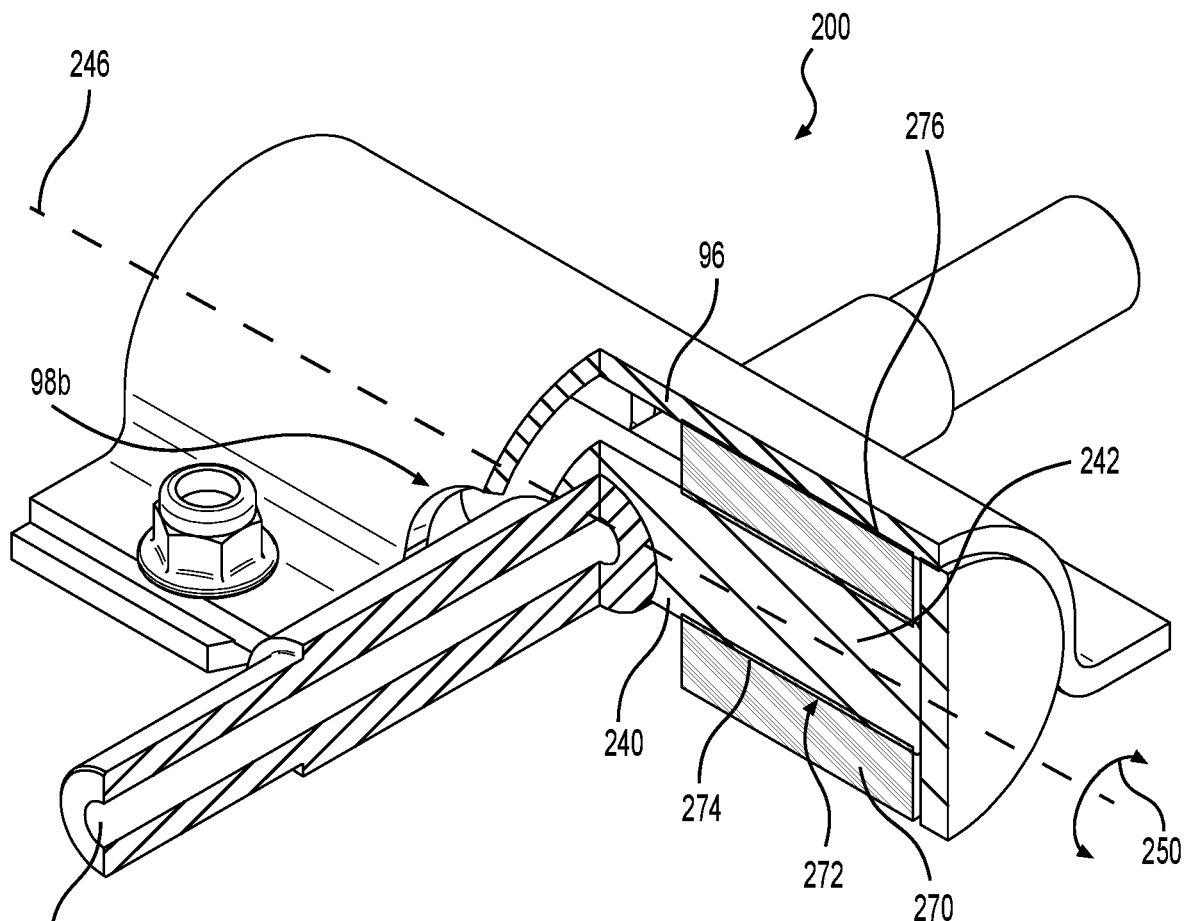
FIG. 8 is a perspective view taken from a top, front, right side of the support structure of FIG. 1, with a cross-sectioned portion of the support structure of FIG. 1 taken through line 8-8 of FIG. 7.

Referring to FIGS. 7 and 8, the support structure 200 as fully assembled will now be described. When fully assembled, the leading and trailing portions 242, 244 of the shaft 240 are received in the apertures 272, 274 of the leading and trailing resilient members 270, 290, as described above.

The leading resilient member 270 is received in the opening of the frame member 96 and in the curved middle portion 302 of the leading connecting member 300. The leading connecting member 300 is fastened to the frame member 96 by the bolts (not shown) passing through the apertures 306a, 306b and the nuts 210a, 210b.

The connection results in the outer portion 276 of the leading resilient member 270 being fixedly connected to the frame member 96 and to the leading connecting member 300. Thus, in the present embodiment, the outer portion 276 is rotatably fixed to the leading connecting member 300 and the frame member 96.

Likewise, the trailing resilient member 290 is received in the opening of the frame member 96 and in the curved middle portion 322 of the trailing connecting member 320. The trailing connecting member 320 is fastened to the frame member 96 by the bolts (not shown) passing through the apertures 326a, 326b and the nuts 210c, 210d. The connection results in the outer portion 296 of the trailing resilient member 290 being fixedly connected to the frame member 96 and to the trailing connecting member 320. Thus, in the present embodiment, the outer portion 296 is rotatably fixed to the trailing connecting member 320 and the frame member 96.

The support structure 200, when fully assembled, as shown in FIGS. 7 and 8, has an initial position. In the initial position, the shaft 240 is positioned such that the axle 260 is transversal to the longitudinal center plane 52, and the leading and trailing resilient members 270, 290 are not deformed in the circumferential direction 250.

As mentioned above, the shaft 240 is rotatable about the longitudinal axis 246. Upon rotation of the shaft 240, the axle 260 pivots about the longitudinal axis 246. Likewise, upon the pivotal movement of the axle 260, the shaft 240 rotates. When the shaft 240 rotates, the inner portions 274, 294 of the leading and trailing resilient members 270, 290 rotate also, as the inner portions 274, 294 are rotatably fixed to the shaft 240. The outer portions 274, 296 of the leading and trailing resilient members 270, 290 however, do not rotate. Thus, as the shaft 240 rotates, the leading and trailing resilient members 270, 290 are subjected to torsion forces, causing the resilient members to resiliently deform in the circumferential direction 250. The resilient deformation results in shear forces biasing the shaft 240, and thus the axle 260, toward their initial position.

In the present embodiment, the shaft 240 is rotatable about the longitudinal axis 246 within a predetermined range of motion of about fifteen (15) degrees in clockwise and counter-clockwise directions. The axle 260, being connected to the shaft 240, has the same predetermined range of motion. It is contemplated that in some embodiments, the predetermined range of motion of the shaft 240 and the axle 260 could be of about sixteen (16) degrees in the clockwise and counter-clockwise directions. It is also contemplated that in some embodiments, the predetermined range of motion of the shaft 240 and the axle 260 could be of about ten (10) degrees in the clockwise and counter-clockwise directions. Beyond this range, the support structure 200 could interfere with the lugs 76 when the track system 50 is driven. The predetermined range of motion is also selected to prevent shear stresses and deformations that could prematurely damage the resilient members 270, 290.

In the present embodiment, the frame member 96 also acts as a mechanical stopper. As mentioned above, the axle 260 extends outwardly from the recesses 98a, 98b of the frame member 96. The recesses 98a, 98b are sized and dimensioned to not interfere with the pivotal movement of the axle 260 while the axle 260 pivots in the predetermined range of motion. The recesses 98a, 98b and the frame member 96 are also configured to limit the pivotal movement of the axle 260 to the predetermined range of motion. For instance, as the axle 260 pivots counter-clockwise and attempts to pivot beyond the maximum range of motion, the axle 260 comes into contact with the frame member 96. Thus, the frame member 96 limits the pivotal movement of the axle 260.

It is contemplated that in some embodiments, the support structure 200 could be configured such that the leading and trailing resilient members 270, 290 could set the predetermined range of motion, accordingly to the elastic properties of the leading and trailing resilient members 270, 290.

Figure 9A:
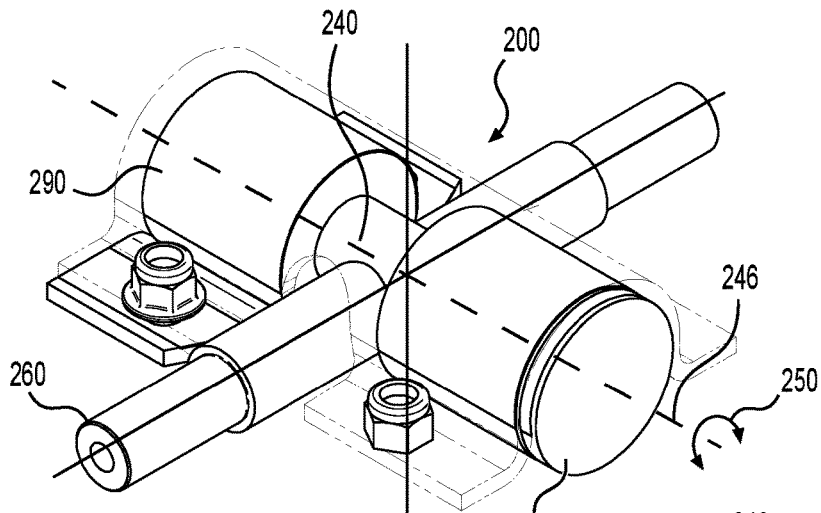
FIG. 9a is a perspective view taken from a top, front, right side of the support structure of FIG. 1, with the frame member shown in phantom lines and with the axle being at an initial position.
Figure 9B:
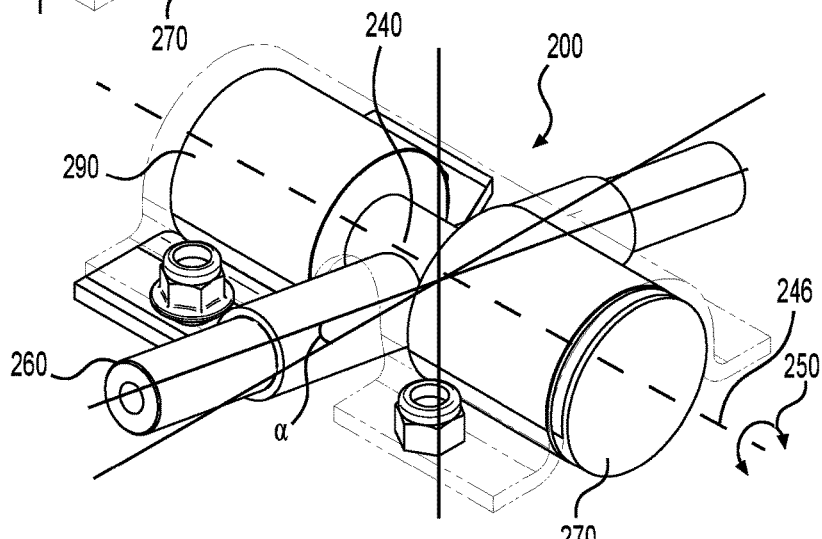
FIG. 9b is a perspective view taken from a top, front, right side of the support structure of FIG. 1, with the frame member shown in phantom lines and with the axle being pivoted at 10 degrees.
Figure 9C:
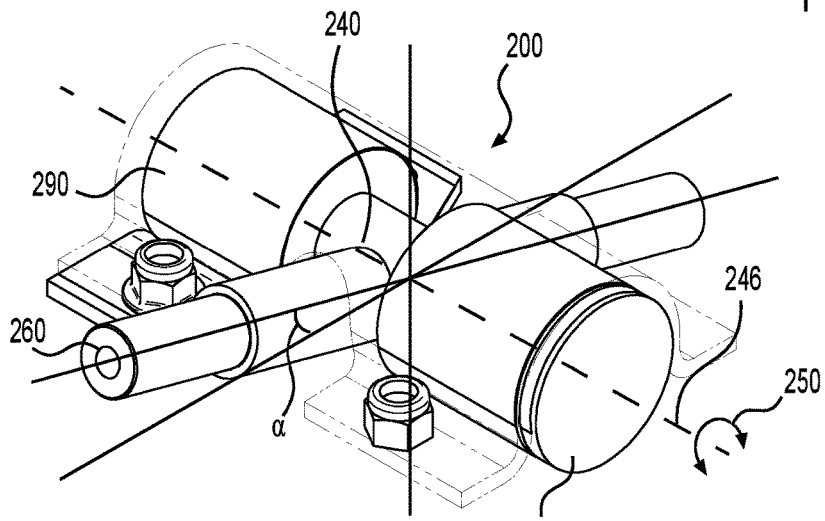
FIG. 9c is a perspective view taken from a top, front, right side of the support structure of FIG. 1, with the frame member shown in phantom lines and with the axle being pivoted at 15 degrees.

Referring now to FIGS. 9a, 9b and 9c, the support structure 200 will be described during operation. Although the left and right support wheels 204a, 204b and the track system 50 are not shown, it is understood that the track system 50, and the support structure 200, is encountering obstacles and/or uneven terrain causing the axle 260 to pivot.

Referring to FIG. 9a, the support structure 200 is in the initial position. Thus, as mentioned above, the axle 260 is parallel to the ground and the leading and trailing resilient members 270, 290 are not deformed in the circumferential direction 250.

Referring to FIG. 9b, the support structure 200 has encountered an obstacle causing the axle 260 to pivot about the longitudinal axis 246 by about ten degrees. As the axle 260 pivots about 10 degrees relative to its initial position (shown by angle alpha (a) in FIG. 9b) about the longitudinal axis 246, the shaft 240 rotates about 10 degrees about the longitudinal axis 246. As soon as the shaft 240 is offset from its initial position, the leading and trailing resilient members 270, 290 are resiliently deformed. Thus, the leading and trailing resilient members 270, 290 bias the shaft 240 and the axle 260 toward their initial positions. Therefore, once the support structure 200 has longitudinally passed the obstacle, the shaft 240 and the axle 260 return to their initial positions.

Referring to FIG. 9c, the support structure 200 has encountered an obstacle causing the axle 260 to pivot about the longitudinal axis 246 by fifteen degrees. As the axle 260 pivots fifteen degrees relative to its initial position (shown by angle alpha (a) in FIG. 9c) about the longitudinal axis 246, the shaft 240 rotates fifteen degrees about the longitudinal axis 246. As soon as the shaft 240 is offset from its initial position, the leading and trailing resilient members 270, 290 are resiliently deformed. Thus, the leading and trailing resilient members 270, 290 bias the shaft 240 and the axle 260 toward their initial positions. Therefore, once the support structure 200 has longitudinally passed the obstacle, the shaft and the axle 260 return to their initial positions.

Materials and Manufacturing

The various components of the support structure 100 and the track system 50 are made of conventional materials (e.g. metals and metal alloys in most cases, such as aluminum and/or steel) via conventional manufacturing processes (e.g. casting, molding, turning, machining, etc.). The present technology does not require any specific materials nor methods of manufacture. The present technology merely requires that each component be suitable for the purpose for which it is intended and the use to which it is to be put. Any material(s) or method(s) of manufacture which produce such components may be used in the present technology.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

The invention claimed is:

1. A support structure for connecting at least one support wheel assembly to a frame of a track system having a longitudinal center plane, the support structure comprising:
at least one connecting member being adapted to connect the support structure to the frame;
a shaft having a first portion and a second portion, the shaft being received in the at least one connecting member and having a longitudinal axis extending parallel to the longitudinal center plane;
at least one axle adapted for supporting the at least one support wheel assembly, the at least one axle being transversally connected to the shaft, and the at least one axle extending outwardly from the at least one connecting member;
at least one resilient member at least partially received in the at least one connecting member, the at least one resilient member defining an aperture, one of the first and second portions of the shaft being received in the aperture, and the at least one resilient member having an inner portion and an outer portion;
the inner portion of the at least one resilient member being fixedly connected to the one of the first and second portions of the shaft, and the outer portion of the at least one resilient member being fixedly connected to the at least one connecting member,
the shaft being rotatable about the longitudinal axis upon resilient deformation of the at least one resilient member, and the at least one axle being pivotable about the longitudinal axis together with the shaft, and
the shaft having an initial position, the at least one resilient member biasing the shaft toward the initial position upon rotation of the shaft about the longitudinal axis.

2. The support structure of claim 1, wherein the shaft is rotatable about the longitudinal axis within a range of motion of between about −15 and about +15 degrees relative to the initial position.

3. The support structure of claim 1, wherein the shaft is rotatable about the longitudinal axis within a range of motion of between about −10 and about +10 degrees relative to the initial position.

4. The support structure of claim 1, wherein:
the at least one resilient member includes first and second resilient members, the one of the first and second portions of the shaft being fixedly connected to the inner portion of the first resilient member;
the at least one connecting member includes first and second connecting members, the first connecting member at least partially receiving the first resilient member and being fixedly connected thereto; and
the other one of the first and second portions of the shaft is received in the aperture of the second resilient member, the inner portion of the second resilient member being fixedly connected to the other one of the first and second portions of the shaft, and the outer portion of the second resilient member being fixedly connected to the second connecting member.

5. The support structure of claim 1, wherein:
the frame defines a first recess on a first side of the longitudinal center plane and a second recess on a second side of the longitudinal center plane, and the first recess is sized and dimensioned for stopping pivotal movement of the at least one axle at about 15 degrees in a first direction relative to the initial position, and the second recess is sized and dimensioned for stopping pivotal movement of the at least one axle at about 15 degrees in a second direction relative to the initial position.

6. The support structure of claim 1, wherein the at least one resilient member has a hollow cylindrical shape.

7. The support structure of claim 1, wherein the at least one axle extends outwardly from the shaft in at least one direction.

8. The support structure of claim 1, wherein the at least one resilient member is made of rubber-based material.

9. A track system comprising the support structure of claim 1.

10. The track system of claim 9, wherein the frame has an opening at a bottom side adapted to receive at least a portion of the support structure.

11. A vehicle comprising the track system of claim 9.

* * * * *